(12) United States Patent
Doermann et al.

(10) Patent No.: US 11,303,751 B2
(45) Date of Patent: Apr. 12, 2022

(54) DEVICES AND METHODS FOR FACILITATING QUALITY ASSURANCE IN CONTACT CENTERS

(71) Applicant: XL Equity LLC, Lehi, UT (US)

(72) Inventors: Greg Doermann, Eagle Mountain, UT (US); Jacob Munns, Salt Lake City, UT (US)

(73) Assignee: XL EQUITY LLC, Lehi, UT (US)

( * ) Notice: Subject to any disclaimer, the term of this patent is extended or adjusted under 35 U.S.C. 154(b) by 51 days.

(21) Appl. No.: 16/241,918

(22) Filed: Jan. 7, 2019

(65) Prior Publication Data

US 2020/0220974 A1 Jul. 9, 2020

(51) Int. Cl.
*H04M 3/51* (2006.01)
*G06Q 10/06* (2012.01)

(52) U.S. Cl.
CPC .... *H04M 3/5175* (2013.01); *G06Q 10/06316* (2013.01); *G06Q 10/06398* (2013.01); *H04M 3/5166* (2013.01)

(58) Field of Classification Search
CPC .............. H04M 3/5175; H04M 3/5166; G06Q 10/06316; G06Q 10/06398
USPC ..................................................... 379/265.06
See application file for complete search history.

(56) References Cited

U.S. PATENT DOCUMENTS

| | | | |
|---|---|---|---|
| 2005/0216551 A1* | 9/2005 | Sirstins | H04M 3/5183 709/202 |
| 2009/0217303 A1* | 8/2009 | Grechanik | G06F 11/3414 719/320 |
| 2014/0241519 A1* | 8/2014 | Watson | H04M 3/42221 379/265.06 |
| 2015/0271329 A1* | 9/2015 | Deshmukh | G16H 40/67 379/265.06 |
| 2016/0358115 A1* | 12/2016 | Gustafson | G06Q 10/06395 |

* cited by examiner

*Primary Examiner* — Rasha A Al Aubaidi
(74) *Attorney, Agent, or Firm* — Loza & Loza, LLP; Tyler J. Barrett

(57) ABSTRACT

Quality assurance systems are adapted to facilitate quality assurance of agents working in contact centers. According to at least one example, a quality assurance system may detect a script path employed by an agent through a pitch for at least one call, where the script path is represented by a sequence of agent keypresses associated with respective prerecorded audio scripts, navigations, and dispositions for the pitch. A determination may be made whether the detected script path employed by the agent through the pitch for the at least one call deviates from one or more standard profiles. At least one of the agent who conducted the at least one call or the at least one call may be flagged for further review when it is determined that the at least one call deviates from the one or more standard profiles. Other aspects, embodiments, and features are also included.

6 Claims, 5 Drawing Sheets

DEVICES AND METHODS FOR FACILITATING QUALITY ASSURANCE IN CONTACT CENTERS

TECHNICAL FIELD

The technology discussed below relates generally to customer contact center call systems, and more specifically to methods and devices for facilitating automated quality control for call center agents.

BACKGROUND

Customer contact centers are utilized in many different and diverse organizations for exchanging information between the enterprise and customers. Customer contact centers, which may also be referred to as call centers, have emerged as one of the most important and dynamic areas of a successful business strategy. In many enterprises, contact centers represent a main interfacing point between a client and the enterprise, handling incoming and outgoing calls from and to its clients in support of its operations. For example, telemarketing businesses utilize contact centers to make outgoing calls to market and sell the company's products and services. Service and products businesses utilize contact centers for a variety of purposes including dispatch of account information to a client, maintenance of the company's goods or services, and tracking of product shipments by clients. Contact centers are additionally utilized as an effective method for informational collection for polling and research oriented organizations, such as by conducting surveys.

Advancements in contact center technology may be desirable to further improve the customer experience when interacting with a contact center.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate quality assurance of agents working in contact centers utilizing prerecorded audio scripts. One or more embodiments of the present disclosure include quality assurance systems. According to at least one example, a quality assurance system may include a communications interface and a storage medium coupled to a processing circuit. The processing circuit may include logic configured to detect a script path employed by an agent through a pitch for at least one call. The pitch may include a plurality of prerecorded audio scripts, navigations, and dispositions each associated with respective agent keypresses, and the script path may be represented by a sequence of agent keypresses. The processing circuit may further include logic configured to determine that the detected script path employed by the agent through the pitch for the at least one call deviates from one or more standard profiles, and flag at least one of the agent who conducted the at least one call or the at least one call for further actions.

Additional aspects of the present disclosure include methods operational on a quality assurance system. In at least one example, such methods may include detecting a script path employed by an agent through a pitch for at least one call. The pitch may include a plurality of prerecorded audio scripts, navigations, and dispositions each associated with respective agent keypresses, and the script path may be detected from a sequence of the agent keypresses. A determination may be made that the detected script path employed by the agent through the pitch for the at least one call deviates from one or more standard profiles, and at least one of the agent who conducted the at least one call or the at least one call itself may be flagged for further actions.

Further aspects of the present disclosure include non-transitory processor-readable storage mediums storing processor-executable programming. According to at least one example, the processor-executable programming may be configured to cause a processing circuit to detect a script path employed by an agent through a pitch for at least one call. The pitch may include a plurality of prerecorded audio scripts, navigations, and dispositions each associated with respective agent keypresses, and the script path may be detected from a sequence of the agent keypresses. The processor-executable programming may be further configured to cause a processing circuit to determine that the detected script path employed by the agent through the pitch for the at least one call deviates from one or more standard profiles, and flag at least one of the agent who conducted the at least one call or the at least one call itself for further review.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
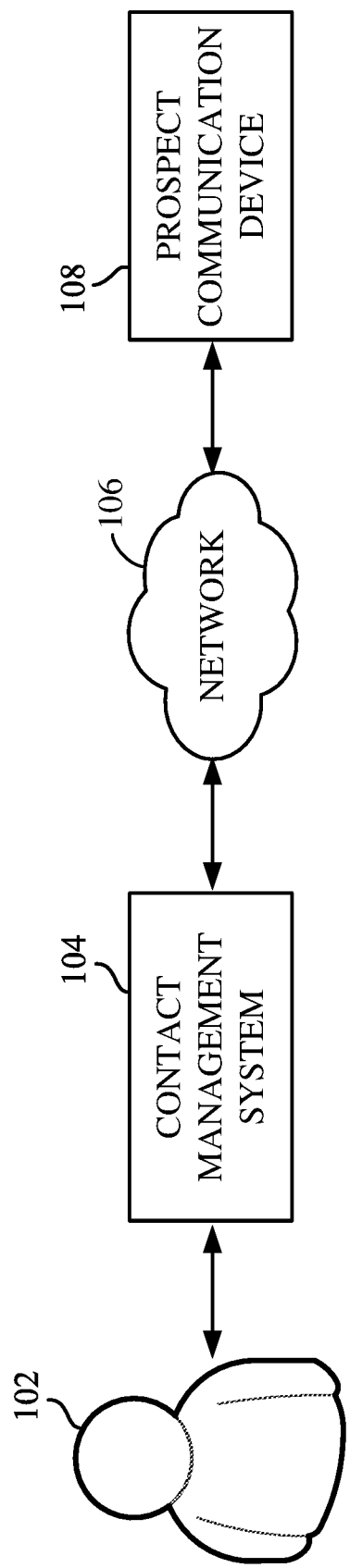
FIG. 1 is a block diagram of a network environment in which one or more aspects of the present disclosure may find application.

Referring now to FIG. 1, a block diagram of a network environment in which one or more aspects of the present disclosure may find application is illustrated. Aspects of the present disclosure can be employed in systems adapted to facilitate the management of inbound and outbound calls between an agent at a contact center and a prospect over a communication network. More specifically, an agent 102 may interact with a contact management system 104 to select one or more prerecorded audio segments or scripts to be played over a communication network 106 to a prospect communication device 108, where each selected prerecorded audio script can be audibly played to a prospect.

The agent 102 may interact with the contact management system 104 by interacting directly with a processing system to select the prerecorded audio scripts stored on the processing system, or by interacting with an agent work station that is communicatively connected to a contact management server where prerecorded audio scripts are stored and played over the communications network 106.

The communications network 106 can include digital and/or analog communication capabilities for telephony and internet connections, as are generally known in the art. The prospect communication device 108 may be any one of a number of known communication devices 108 configured to communicate with the contact management system 104 such as telephone devices, cellular devices, satellite devices, computer-based communication applications, broadband-based devices, and/or VOIP devices.

Figure 2:
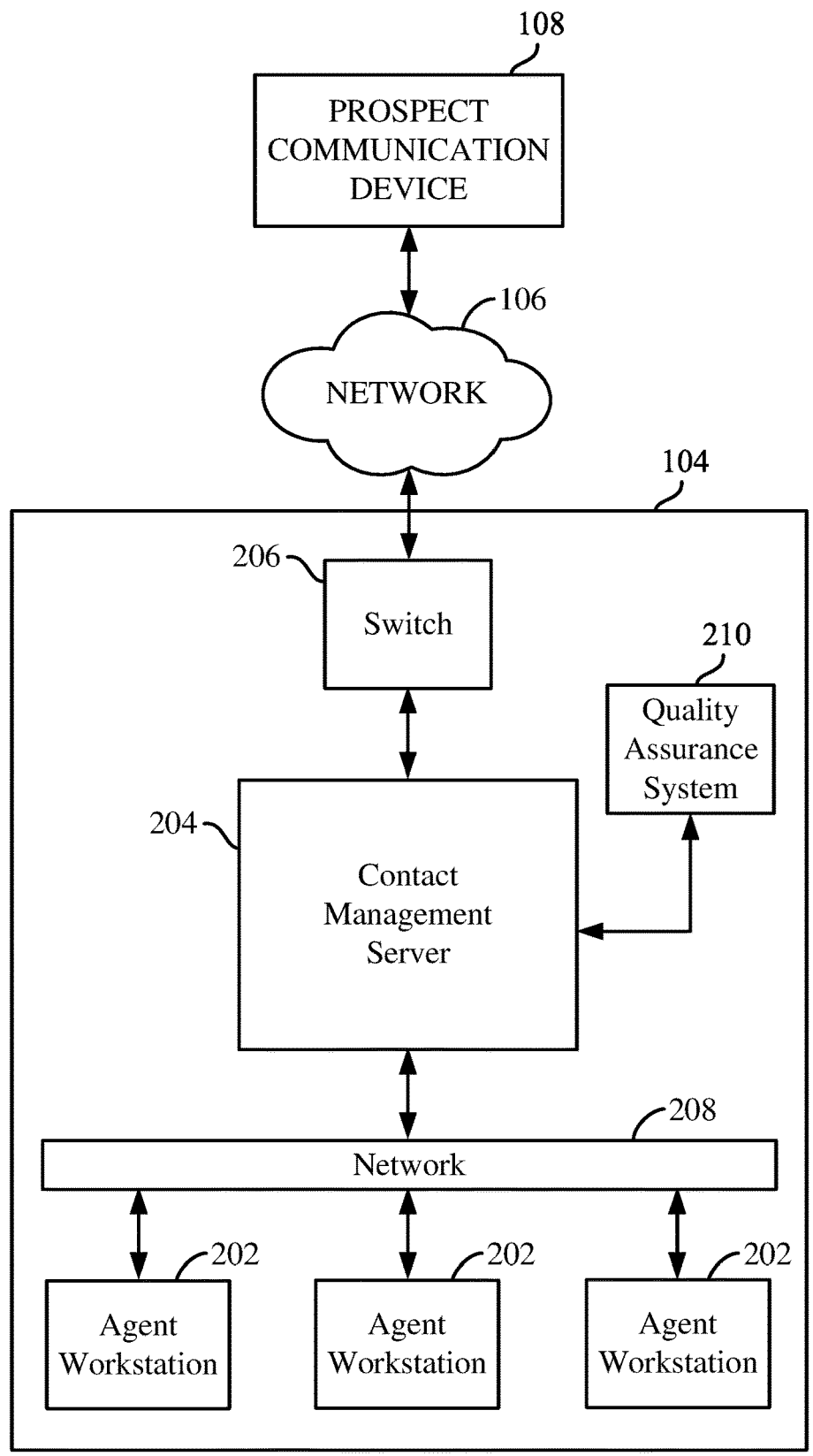
FIG. 2 is a schematic block diagram illustrating select components of a contact management system according to at least one example.

Referring to FIG. 2, a block diagram illustrating select components of the contact management system 104 is depicted according to at least one example. In this example, the agent 102 interacts with the contact management system 104 by interacting with an agent work station 202 that is communicatively connected to a contact management server 204 where prerecorded audio scripts are stored and played over the communications network 106.

Agent workstations 202 may be general-purpose digital computers including programing to provide desired functions for each agent workstation 202. In one embodiment, the agent workstations 202 are personal computers equipped with memory, hard drive, input devices (e.g., a keyboard, mouse, microphone, headphones), and a visual display unit. In some embodiments, a first audio channel may be directed to the left speaker in a set of headphones to broadcast audio associated with a first call, while a second audio channel to the right speaker in the headphones may broadcast audio associated with a second call. In this way, the agent may listen to and manage two conversations simultaneously.

As depicted, the agent workstations 202 may be communicatively connected to a network (e.g., Wide Area Network (WAN), Local Area Network (LAN)) 208 to communicate with the contact management server 204. The contact management server 204 can be connected to at least one switch 206 configured to connect the contact management server 204 with the communications network 106. The communications network 106 typically connects a prospect communication device 108 to the contact management server 204 via at least one switch 206. The telephony switch 206 can be controllable by the contact management server 204, which may be configured to make, break or change connections between telephone lines in order to establish, terminate, or change a telephone call path. The switch 206 can be a Private Branch Exchange (PBX) switch and may be one of any number of known switches. The switch 206 is preferably configured to provide network information such as ANI (answer number identification, also known as Caller Line Identification (CLI)) and DNI (dialed number identification). In one embodiment, the switch 206 is configured to perform intelligent dialing functions and to transfer calls as requested by the contact management server 204. In at least some embodiments, the switch 206 can be implemented in one or more stand-alone devices signally connected to the contact management server 204. In one or more other embodiments, the switch 206 may be implemented in software and/or hardware in the contact management server 204.

Generally speaking, the contact management server 204 manages functional aspects of the contact management system 104, including managing one or more databases, managing interactions between the caller, the contact management system 104, and the agent workstations 202, and monitoring and controlling the switch 206. The contact management server 204 may include an inbound call manager to connect calls to an agent-operator if one is available, and send the call to a voicemail recorder otherwise. The contact management server 204 may be configured to log operational statistics of the switch 206, such as call duration, receiver connection address, and caller connection address. The contact management server 204 may provide administrative access and tools to manage, monitor, and create prerecorded audio scripts. The contact management server 204 may be configured to manage predetermined administrative functions, such as user accounts and SIP settings. The contact management server 204 may also provide a number of reporting tools for monitoring the agent-operators and dialer performance, and access to prerecorded audio scripts.

During a typical inbound or outbound call with a prospect, the agent 102 is presented a pitch associated with a particular campaign being performed by a contact center. A pitch will include a plurality of prerecorded audio scripts to be utilized by an agent 102 to conduct a call with a prospect. Such prerecorded audio scripts may include prerecorded scripts and prerecorded global scripts, as will be described in more detail hereafter. Each pitch may be depicted in a flow diagram based on typical and expected statements that a prospect may make at any given time during a pitch.

Figure 3:
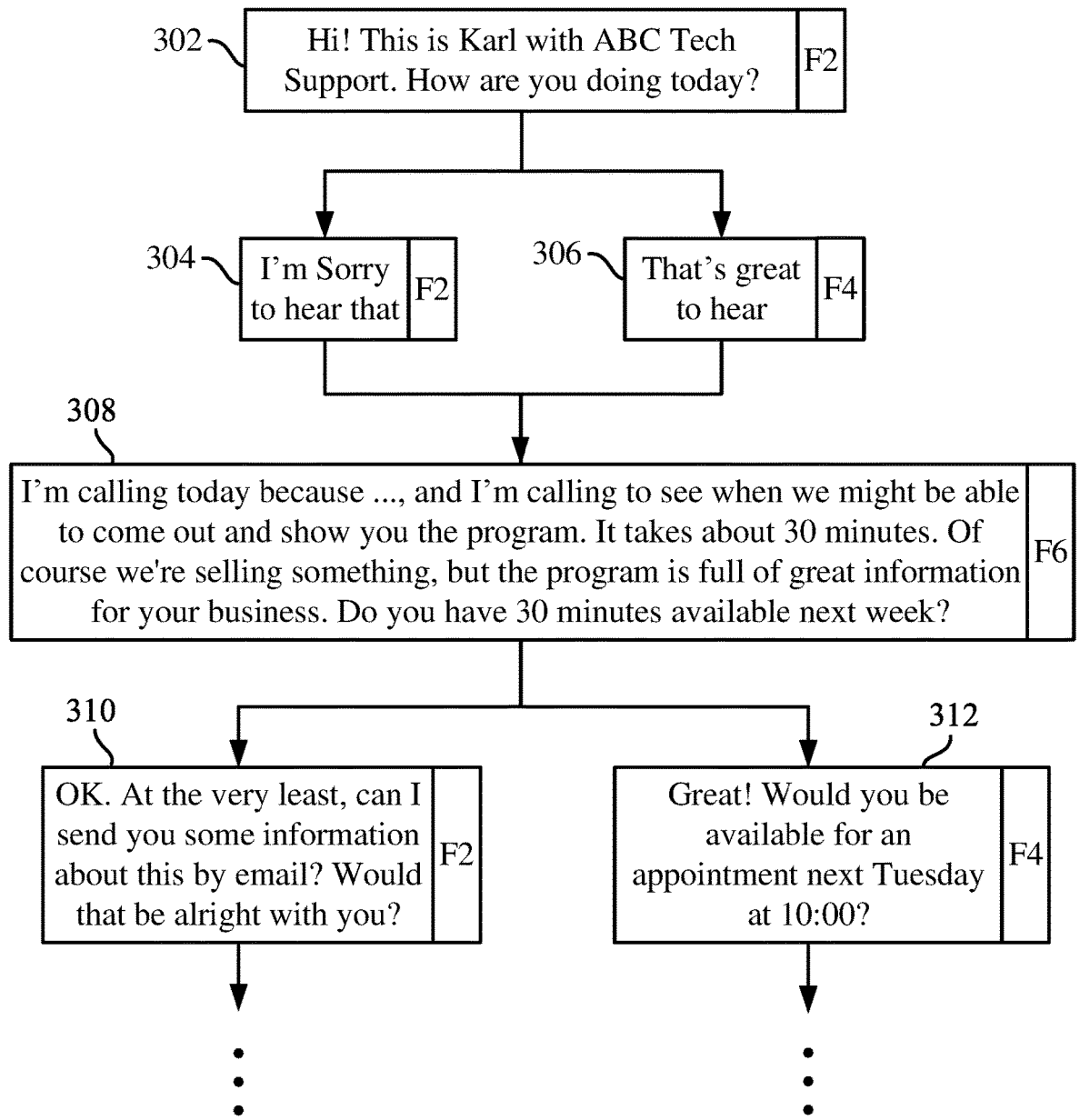
FIG. 3 is a flow diagram illustrating a simplified example of a segment of a pitch according to at least one example.

FIG. 3 is a flow diagram illustrating a simplified example of a portion of a pitch according to at least one example. In the example, there may be additional scripts that are played before the first depicted script. This is an example of an outbound call, but it will be apparent to those of ordinary skill in the art that similar calls may be received as inbound calls at the contact center. Further, specific computer keyboard keys are referenced in this example, but it will be apparent to those of ordinary skill in the art that any keyboard key or combination of keys may be utilized in different embodiments. Referring to FIGS. 2 and 3, a prospect may be contacted and an agent may select a key on the agent workstation 202 to play the prerecorded script 302 to the prospect. As shown in this example, the key F2 can be associated with this prerecorded script at this stage in the campaign so that when the agent presses F2, the prerecorded script 302 is played to the prospect.

After the prerecorded script 302 is played to the prospect, new script options may be displayed to the agent, based on expected responses. For instance, prerecorded script 304 may be available to the agent for instances when the prospect may respond with a negative answer, and prerecorded script 306 may be available to the agent for instances when the prospect may responds with a positive answer. In this example, the key F2 may now be associated with the prerecorded script 304 and the key F4 may be associated with the prerecorded script 306. The agent can accordingly press either F2 to play the prerecorded script 304 to the prospect or F4 to play the prerecorded script 306 to the prospect. Upon pressing a particular key at the agent workstation 202, a signal is sent to the contact management server 204 indicating the particular key pressed by the agent, and the associated prerecorded script is conveyed over the network 106 to the prospect communication device 108. In at least some implementations, the audio may also be conveyed back to the agent to enable the agent to hear the audio played to the prospect.

After playing a response script, a new script may be displayed to the agent. In this example, only one prerecorded script 308 is displayed at this point in the pitch. The agent can therefore select prerecorded script 308 to be played to the prospect, or it may be set to play automatically after a response is played by either of prerecorded scripts 304, 306. In this example, the key associated with prerecorded script 308 is F6. When the agent presses the F6 key, the prerecorded script 308 is conveyed over the network 106 to the prospect.

After the prerecorded script 308 is conveyed to the prospect, new script options may be displayed to the agent, based on expected responses. For instance, prerecorded script 310 may be available to the agent for instances when the prospect responds with a negative answer, and prerecorded script 312 may be available to the agent for instances when the prospect responds with a positive answer. In this example, the F2 key may now be associated with the prerecorded script 310 and the key F4 may be associated with the prerecorded script 312. The agent can accordingly press either F2 to play prerecorded script 310 to the prospect, or F4 to play prerecorded script 312 to the prospect. Upon pressing a particular key at the agent workstation 202, a signal may be sent to the contact management server 204 indicating the particular key pressed by the agent, and the associated prerecorded script may be conveyed over the network 106 to the prospect communication device 108. In other embodiments, a signal indicating the particular key pressed by the agent may be stored at the agent workstation 202.

The script may continue forward in a similar manner, with the agent selecting prerecorded scripts to be played to the prospect. Throughout this conversation, the agent may also have access to one or more prerecorded audio scripts referred to herein as prerecorded global script options, which can be played at any time by pressing an associated key. For example, prerecorded global scripts may include "yes," "no," a laugh, "uh huh," "okay," "I understand," "I'm sorry," "could you repeat that," "great," as well as additional and/or other prerecorded audio scripts options.

There can also be keys for going back in the script or for going to another area of the script away from the general flow path. Such key presses may be referred to herein as "navigations." Navigations refer to agent keypresses that move the script to different locations of the pitch. For example, a navigation may include a predetermined key or key combination causing the pitch to go back to a previous location in the script. In another example, a navigation may include a predetermined key or key combination that takes the pitch to a voicemail option, such as to a prerecorded audio segment for leaving a voice message, etc. In some examples, one or more prerecorded global script options can also include navigations, which change the script flow path, such as the voicemail example above.

In addition to the prerecorded audio scripts (e.g., the prerecorded scripts, the prerecorded global scripts) and the navigations, the agent may also have access to one or more dispositions. A disposition refers to how to handle that prospect for future contact, such as putting the contact on a do-not-contact list, voicemail, "call back later," "can't afford now," etc. Respective keys may be associated with different available dispositions for a call. Some dispositions may be unassociated with any prerecorded script segment, while other dispositions may be associated with one or more prerecorded script segments.

Use of prerecorded audio scripts (e.g., prerecorded scripts, prerecorded global scripts), navigations, and dispositions can enable all agents to sound and communicate like a top performing agent. Each agent, however, must still utilize the scripts, navigations, and dispositions in a proper and intended manner for the communications to be effective and feel natural. Quality control is typically employed to ensure that each agent is utilizing the scripts, navigations, and dispositions efficiently and in the manner intended by monitoring calls to confirm proper sequences of prerecorded audio scripts, navigations, and dispositions.

As can be seen in FIG. 3, each pitch will have one or more paths that represent optimal call paths for that pitch. For example, if the call center receives a call from a prospect indicating that the prospect has a problem with a bill, the company whose customer has placed the call typically has a specific path that they expect those types of calls to follow to ensure it is handled in the appropriate manner. In addition to these optimal call paths, it is expected that there will be also some deviation from the optimal call paths. For example, there will be a certain percentage of prospects who are not qualified, not interested, have an unexpected question, etc. These optimal call paths and expected deviations may all be referred to herein as standard profiles.

Historically, quality assurance of each agent in a call center required another employee, such as a supervisor, to listen to calls performed by each agent individually to ensure the agent is following a proper call path within a standard profile. According to one or more aspects of the present disclosure, a quality assurance system 210 is included in the contact management system 104, as depicted in FIG. 2. The quality assurance system 210 can be communicatively coupled to the contact management server 204 to receive information about the keypresses by an agent during each phone call. In other embodiments, the quality assurance system 210 can be coupled to the network 208 to receive such information. In still other embodiments, the quality assurance system 210 may be implemented by the contact management server 204, such that the quality assurance system is part of the contact management server 204. Those of ordinary skill in the art will recognize that other configurations may be utilized to achieve the same functionality for quality assurance, as set forth herein. In general, the quality assurance system 210 is employed within the contact management system 104 in any manner that enables the quality assurance system 210 to obtain information relevant to evaluating the keypresses and their sequences, as described in more detail herein.

The quality assurance system 210 is generally adapted to perform automated review of one or more calls conducted at a call center and/or one or more agents in a call center to identify calls and/or agents for additional analysis, review, training, and/or other actions. More specifically, the quality assurance system 210 of the present disclosure reviews a script path through a pitch for one or more calls as represented by the sequence of agent keypresses, identifies one or more irregularities or deviations (e.g., irregularities or deviations in a particular call, irregularities or deviations by a particular agent over several calls, etc.), and flags those calls with irregularities or deviations for further actions.

Figure 4:
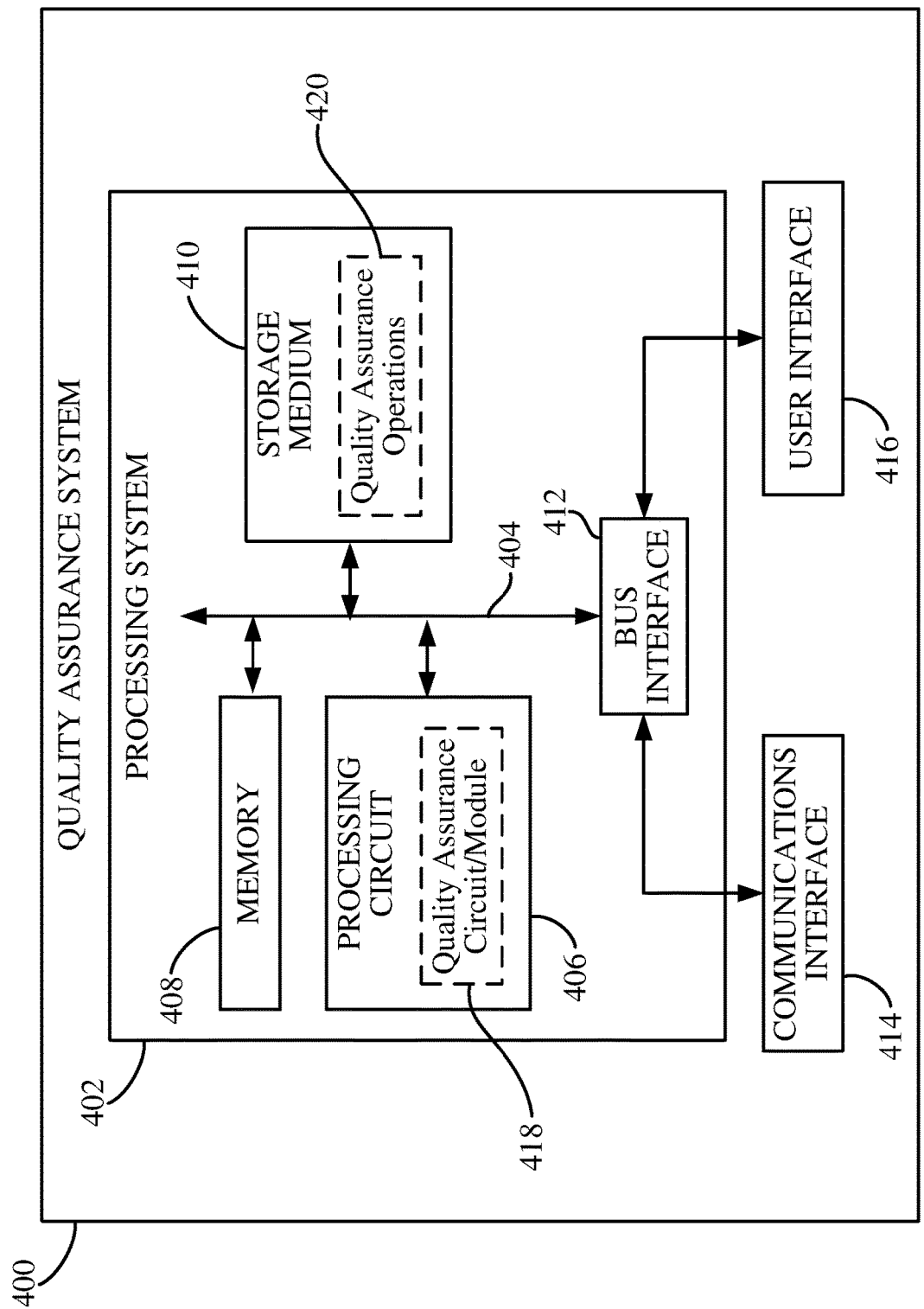
FIG. 4 is a block diagram illustrating select components of a quality assurance system employing a processing system according to at least one example of the present disclosure.

Turning to FIG. 4, a block diagram is shown illustrating select components of quality assurance system 400 employing a processing system 402 according to at least one example of the present disclosure. In this example, the processing system 402 is implemented with a bus architecture, represented generally by the bus 404, although other embodiments may alternatively be implemented by a distributed system. The bus 404 may include any number of interconnecting buses and bridges depending on the specific application of the processing system 402 and the overall design constraints. The bus 404 communicatively couples together various circuits including one or more processors (represented generally by the processing circuit 406), a memory 408, and computer-readable media (represented generally by the storage medium 410). The bus 404 may also link various other circuits such as timing sources, peripherals, voltage regulators, and power management circuits, which are well known in the art, and therefore, will not be described any further. A bus interface 412 provides an interface between the bus 404 and a communications interface 414. The communications interface 414 provides a communication interface or means for communicating with various other apparatus over a transmission medium. Depending upon the nature of the contact management server, a user interface 416 (e.g., keypad, display, speaker, microphone, joystick) may also be provided.

The processing circuit 406 is responsible for managing the bus 404 and general processing, including the execution of programming stored on the computer-readable storage medium 410. The programming, when executed by the processing circuit 406, causes the processing system 402 to perform the various functions described below for any particular apparatus. The computer-readable storage medium 410 and the memory 408 may also be used for storing data that is manipulated by the processing circuit 406 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 406 is arranged to obtain, process and/or send data, control data access and storage, issue commands, and control other desired operations. The processing circuit 406 may include circuitry adapted to implement desired programming provided by appropriate media, and/or circuitry adapted to perform one or more functions described in this disclosure. For example, the processing circuit 406 may be implemented as one or more processors, one or more controllers, and/or other structure configured to execute executable programming and/or execute specific functions. Examples of the processing circuit 406 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 406 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 406 are for illustration and other suitable configurations within the scope of the present disclosure are also contemplated.

In some instances, the processing circuit 406 may include a quality assurance circuit and/or module 418. The quality assurance circuit/module 418 may generally include circuitry and/or programming (e.g., programming stored on the storage medium 410) adapted to detect a call path through a pitch for one or more calls as represented by the sequence of agent keypresses for each call, identify one or more irregularities or deviations (e.g., irregularities or deviations in a particular call, irregularities or deviations by a particular agent over several calls, etc.) in a call path, and flag those irregularities or deviations for further actions, as indicated in more detail in this disclosure. As used herein, reference to circuitry and/or programming may be generally referred to as logic (e.g., logic gates and/or data structure logic).

The storage medium 410 may represent one or more computer-readable devices for storing programming, such as processor executable code or instructions (e.g., software, firmware), electronic data, databases, or other digital information. The storage medium 410 may also be used for storing data that is manipulated by the processing circuit 406 when executing programming. The storage medium 410 may be any available non-transitory media that can be accessed by a general purpose or special purpose processor, including portable or fixed storage devices, optical storage devices, and various other mediums capable of storing, containing and/or carrying programming. By way of example and not limitation, the storage medium 410 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 410 may be coupled to the processing circuit 406 such that the processing circuit 406 can read information from, and write information to, the storage medium 410. That is, the storage medium 410 can be coupled to the processing circuit 406 so that the storage medium 410 is at least accessible by the processing circuit 406, including examples where the storage medium 410 is integral to the processing circuit 406 and/or examples where the storage medium 410 is separate from the processing circuit 406 (e.g., resident in the processing system 402, external to the processing system 402, distributed across multiple entities).

Programming stored by the storage medium 410, when executed by the processing circuit 406, can cause the processing circuit 406 to perform one or more of the various functions and/or process steps described herein. In at least some examples, the storage medium 410 may include quality assurance operations 420. The quality assurance operation 420 are generally adapted to cause the processing circuit 406 to detect a call path through a pitch for one or more calls as represented by the sequence of agent keypresses for each call, identify one or more irregularities or deviations (e.g., irregularities or deviations in a particular call, irregularities or deviations by a particular agent over several calls, etc.) in a call path, and flag those irregularities or deviations for further actions as indicated in more detail below.

Thus, according to one or more aspects of the present disclosure, the processing circuit 406 is adapted to perform (independently or in conjunction with the storage medium 410) any or all of the processes, functions, steps and/or routines for any or all training system devices described herein (e.g., contact management server 204, contact management server 400). As used herein, the term "adapted" in relation to the processing circuit 406 may refer to the processing circuit 406 being one or more of configured, employed, implemented, and/or programmed (in conjunction with the storage medium 410) to perform a particular process, function, step and/or routine according to various features described herein.

In operation, the quality assurance system 400 can detect a call path through a pitch for one or more calls as represented by the sequence of agent keypresses for each call, identify one or more irregularities or deviations in a call path, and flag those irregularities or deviations for further actions. In one example, the quality assurance system 400 may detect a plurality of calls for a particular agent, identify one or more irregularities with the plurality of calls, and flag the agent for further review, training, and/or other actions. In another example, the quality assurance system 400 may detect a call path through a pitch for an individual call, identify one or more irregularities or deviations with the call, and flag the call for further actions.

Figure 5:
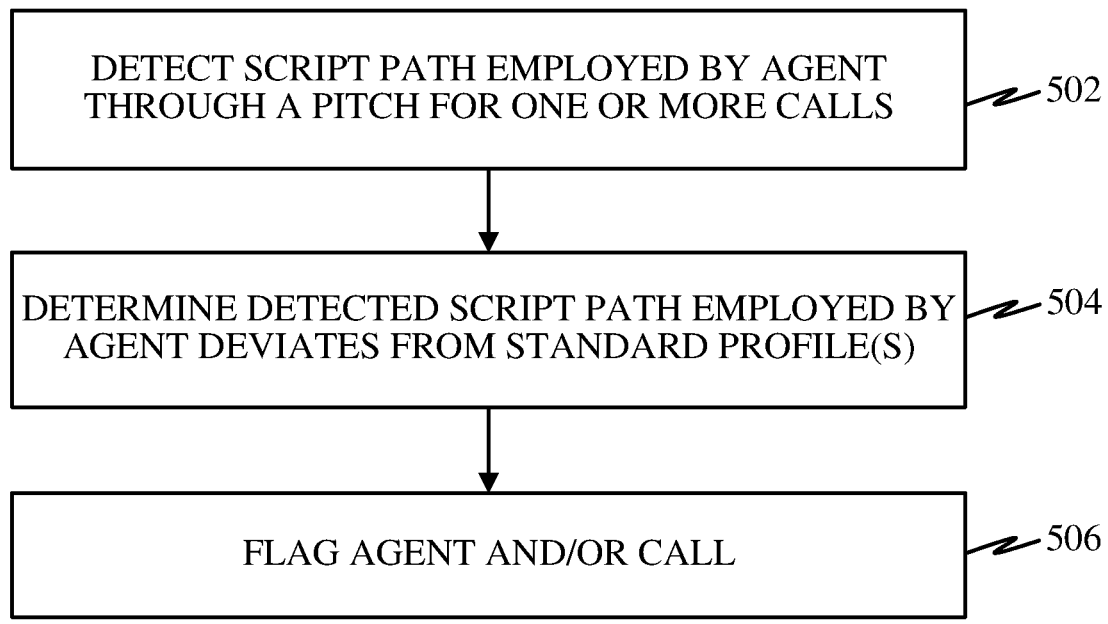
FIG. 5 is a flow diagram illustrating a method operational on a quality assurance system according to at least one example.

FIG. 5 is a flow diagram illustrating a method operational on a quality assurance system, such as the quality assurance system 400, according to at least one implementation of the present disclosure. At 502, the quality assurance system 400 may detect a script path employed by an agent through a pitch for at least one call. For example, the quality assurance system 400 may include logic (e.g., quality assurance circuit/module 418 and/or quality assurance operations 420) to detect a script path employed by an agent through a pitch for at least one call. In some instances, this may include detecting a plurality of respective script paths for each of a plurality of calls performed by one agent, which may be useful in identifying abnormal tendencies to follow one or more particular script paths, as will be discussed in more detail below. In other instances, this may include detecting just a single script path associated with a single call performed by an agent, which may useful in identifying abnormal individual calls by an agent.

As noted above with reference to FIG. 3, each call performed by an agent is conducted by utilizing keys to select prerecorded audio scripts (e.g., prerecorded scripts, prerecorded global scripts), navigations, and dispositions. For instance, one script path through the example pitch in FIG. 3 may be represented by the following sequence of agent keypresses including F2 F4 F6 F4. Another script path may be represented by a sequence of agent keypresses including F2 F2 F6 F2. As will be apparent, other expected script paths may occur, and additional or alternate keypresses may be utilized for the same or different prerecorded audio scripts, for navigations, and for dispositions. Because each script path can be represented by agent keypresses, the operation 502 may be performed by simply obtaining or recording the sequence of agent keypresses, without any need of the actual audio scripts that were played, navigations, or dispositions. For instance, the quality assurance system 400 may include logic (e.g., quality assurance circuit/module 418 and/or quality assurance operations 420) to capture, obtain, and/or record the agent keypresses associated with a call in the sequence they are selected by the agent.

At 504, the quality assurance system 400 can determine that the detected script path employed by the agent deviates from one or more standard profiles. For example, the quality assurance system 400 may include logic (e.g., quality assurance circuit/module 418 and/or quality assurance operations 420) to determine that the detected script path employed by the agent deviates from one or more standard profiles.

As noted above, each pitch will have one or more paths that represent standard profiles. Each agent should handle a relatively similar percentage of calls that follow each of the various standard profiles. For example, each agent should handle a relatively similar percentage of prospects who are not qualified, not interested, have an unexpected question, etc. According to some aspects of the present disclosure, after detecting a plurality of respective script paths for each of a plurality of calls performed by a single agent, the quality assurance system 400 can identify abnormal tendencies by the agent to follow one or more particular script paths. In such examples, the standard profiles may include a range of percentages for the total number of calls that follow a specific script path.

According to such examples, the quality assurance system 400 may obtain a plurality of predefined call groupings, where each call grouping is associated with at least one predefined script path or standard profile. For example, a first call grouping may include calls that follow a first path through the example in FIG. 3, which a second call grouping may include calls that follow a second path through the example in FIG. 3. Additional respective call groupings may include calls where a prospect was not qualified, not interested, has an unexpected question, asks to be placed on a do-not-call list, etc. The quality assurance system 400 may include logic (e.g., quality assurance circuit/module 418 and/or quality assurance operations 420) to group each respective script path of the plurality of script paths employed by the agent into respective call groupings. After all of the script paths are grouped into their proper call groupings, the quality assurance system 400 may include logic (e.g., quality assurance circuit/module 418 and/or quality assurance operations 420) to determine a percentage of the total number of calls that were grouped in each call grouping, and determine whether any percentage is above a threshold, below a threshold, and/or outside of a predefined acceptable range, where the threshold and/or predefined acceptable range represents the standard profiles for percentages in each call grouping.

As an example, a standard profile for calls where the prospect asks to be placed on a do-not-call list may be between 10% and 15%. This may indicate that most agents typically handle between 10% and 15% of calls in which the prospect asks to be placed on a do-not-call list. The quality assurance system 400 can identify all calls by an agent that include keypresses indicating that the prospect requested being placed on a do-not-call list, and can calculate the percentage of calls performed by the agent that are grouped in that specific call grouping. The quality assurance system 400 can then determine whether the calculated percentage is outside of the standard profile (e.g., 10%-15%). If a determination is made that one or more percentages of the agent's call groupings are outside of the standard profile ranges, then the quality assurance system 400 may conclude that the agent has an abnormal distribution that may merit additional review.

Another example of such a standard profile may include a percentage of calls in a day that are successful. For example, a call center may conclude a day with an average success rate of 40%. The quality assurance system 400 can group all successful calls for each agent into a specific call grouping, and can calculate the percentage of calls that were successful for each agent. The quality assurance system 400 can further detect any agent who had a success rate below a predefined percentage. For instance, if the average success rate was 40%, a threshold may be set at 30%, whereby each agent with a percentage of calls grouped into the "successful" call grouping less than 30% can be identified.

According to further aspects, some individual calls may simply follow an abnormal path that may not be expected for a particular pitch, or that are very rarely encountered. According to such examples, determining that the detected script path deviates from a standard profile may simply include comparing the sequence of agent keypresses representing the detected script path to one or more predefined standard profiles. For example, if an agent presses a navigation key for causing the pitch to go backward to a previous location in the script where such navigation key is unusual, such navigation may create a sequence of agent keypresses that does not match a keypress sequence for any standard profile. The quality assurance system 400 may include logic (e.g., quality assurance circuit/module 418 and/or quality assurance operations 420) to compare the sequence of agent keypresses for the detected script path to respective keypress sequences for one or more predefined standard profiles. If the sequence of agent keypresses does not match any keypress sequence for the one or more standard profiles, then the quality assurance system 400 may conclude that the particular call is abnormal and may merit additional review.

At step 506, the quality assurance system 400 can flag the agent who conducted a call and/or the call itself for additional review. For example, the quality assurance system 400 may include logic (e.g., quality assurance circuit/module 418 and/or quality assurance operations 420) to flag the agent and/or the call for additional review. In the example above where the quality assurance system 400 determines that a percentage of calls by an agent falls outside of one or more standard profiles, the quality assurance system 400 may flag the agent for review and/or training. In the example above where the quality assurance system 400 determines that a single call is outside of any standard profile, then the call itself may be flagged to be reviewed. For instance, the call may be sent for manual review, or for speech to text conversion and further computer review.

Aspects of the present disclosure described herein can enable an automated system to flag script paths that are irregular and that don't fit into a "normal" path (e.g., a standard profile path). Aspects of the present disclosure described herein can also summarize an agent's script paths according to the percentage of calls that fit into different standard profile script paths, and can flag an agent if the agent has an abnormally high percentage of calls following one or more standard profile script paths compared to the rest of a group of agents. Such features can enable comparisons between agents, as well as comparisons between locations and teams to other locations and teams to identify locations or teams that may have been trained wrong.

Although the above disclosure specifically refers to keypresses, it should be understood that a keypress may be a keypress from a keyboard, as well as selection of a graphical "key" on a touchscreen device, selection of a graphical "key" with a mouse, or other similar ways for selecting an audio segment to be played to a prospect. Accordingly, the term "keypress" should be understood to include all of these examples and other similar examples for selecting an audio script segment to be played.

While the above discussed aspects, arrangements, and embodiments are discussed with specific details and particularity, one or more of the components, steps, features and/or functions illustrated in FIGS. 1, 2, 3, 4, and/or 5 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 4 may be configured to perform or employ one or more of the methods, features, parameters, and/or steps described in FIGS. 3 and/or 5. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A quality assurance system, comprising:
   a communications interface;
   a storage medium; and
   a processing circuit coupled to the communications interface and the storage medium, wherein the processing circuit comprises logic to:
   detect a plurality of respective sequences of electrical signals, wherein each electrical signal indicates a respective agent keypress, and wherein a each sequence of respective agent keypresses represents a detected script path employed by an agent through a pitch for each of a plurality of calls performed by the agent, the pitch comprising a plurality of prerecorded audio scripts, navigations, and dispositions;
   obtain a plurality of predefined call groupings, where each call grouping is associated with at least one predefined script path;
   group each respective script path of the plurality of respective script paths employed by the agent into a respective call grouping of the plurality of predefined call groupings;
   determine that a percentage of the plurality of script paths grouped into at least one respective call grouping is outside of a standard profile, wherein the standard profile defines a range of percentages for the at least one respective call grouping; and
   flag the agent who conducted the plurality of calls.

2. A method operational on a quality assurance system, comprising:
   detecting a plurality of respective sequences of electrical signals indicating a sequence of respective agent keypresses, wherein each sequence of respective agent keypresses represents a detected script path employed by an agent through a pitch for each of a plurality of calls performed by the agent, the pitch comprising a plurality of prerecorded audio scripts, navigations, and dispositions each associated with respective agent keypresses;
   identifying a plurality of predefined call groupings, where each call grouping is associated with at least one predefined script path;
   grouping each respective script path of the plurality of respective script paths employed by the agent into a respective call grouping of the plurality of predefined call groupings;
   determining that a percentage of the plurality of script paths grouped into at least one respective call grouping is outside of a standard profile, wherein the standard profile defines one of a range of percentages for the at least one respective call grouping or a threshold percentage value for the at least one respective call grouping; and
   flagging the agent who conducted the plurality of calls.

3. A non-transitory processor-readable storage medium storing processor-executable programming for causing a processing circuit to:
   detect a plurality of respective sequence of electrical signals indicating a sequence of respective agent keypresses, wherein each sequence of respective agent keypresses represents a detected script path employed by an agent through a pitch for each of a plurality of calls performed by the agent, the pitch comprising a plurality of prerecorded audio scripts, navigations, and dispositions;
   obtain a plurality of predefined call groupings, where each call grouping is associated with at least one predefined script path;
   group each respective script path of the plurality of respective script paths employed by the agent into a respective call grouping of the plurality of predefined call groupings;
   determine that a percentage of the plurality of script paths grouped into at least one respective call grouping is outside of a standard profile, wherein the standard profile defines a range of percentages for the at least one respective call grouping or a threshold percentage value for the at least one respective call grouping; and
   flag the agent who conducted the plurality of calls for additional review.

4. A quality assurance system, comprising:
   a communications interface;
   a storage medium; and
   a processing circuit coupled to the communications interface and the storage medium, wherein the processing circuit comprises logic to:
   detect a sequence of electrical signals, wherein each electrical signal indicates a respective agent keypress, and wherein a sequence of respective agent keypresses represents a detected script path employed by an agent through a pitch for at least one call, the pitch comprising a plurality of prerecorded audio scripts, navigations, and dispositions;
   compare the sequence of respective agent keypresses representing the detected script path to a plurality of standard profiles, each standard profile represented by a respective sequence of agent keypresses;
   determine that the sequence of agent keypresses deviates from each of the standard profiles; and
   flag the at least one call.

5. A method operational on a quality assurance system, comprising:
   detecting a sequence of electrical signals indicating a sequence of respective agent keypresses, wherein the sequence of respective agent keypresses represents a detected script path employed by an agent through a pitch for at least one call, the pitch comprising a plurality of prerecorded audio scripts, navigations, and dispositions each associated with respective agent keypresses;
   comparing the sequence of agent keypresses representing the detected script path to a plurality of standard profiles, each standard profile represented by a respective sequence of agent keypresses;
   determining that the sequence of agent keypresses deviates from each of the standard profiles; and
   flagging the at least one call.

6. A non-transitory processor-readable storage medium storing processor-executable programming for causing a processing circuit to:
   detect a sequence of electrical signals indicating a sequence of respective agent keypresses, wherein the sequence of respective agent keypresses represents a detected script path employed by an agent through a pitch for at least one call, the pitch comprising a plurality of prerecorded audio scripts, navigations, and dispositions;

compare the sequence of agent keypresses representing the detected script path to a plurality of standard profiles, each standard profile represented by a respective sequence of agent keypresses;
determine that the sequence of agent keypresses deviates from each of the standard profiles; and
flag the call for additional review.

* * * * *